United States Patent [19]

Saint-André

[11] 3,878,461
[45] Apr. 15, 1975

[54] APPARATUS FOR MEASUREMENT OF THE AMOUNT OF IMPURITY IN A FLUID

[75] Inventor: Robert Eugène Saint-André, Limoges, France

[73] Assignee: Sofrance, S.A., Limoges, France

[22] Filed: July 30, 1970

[21] Appl. No.: 59,585

[30] Foreign Application Priority Data
Aug. 4, 1969 France .............................. 69.26693

[52] U.S. Cl. .............................................. 324/61 R
[51] Int. Cl. ........................................... G01r 27/26
[58] Field of Search ........... 324/61, 61 B, 61 M, 30, 324/65; 73/38

[56] References Cited
UNITED STATES PATENTS

| | | | |
|---|---|---|---|
| 3,238,452 | 3/1966 | Schmitt et al. | 324/61 |
| 3,499,315 | 3/1970 | Marino | 73/38 X |
| 3,546,926 | 12/1970 | Dunavent et al. | 324/61 X |

*Primary Examiner*—Alfred E. Smith
*Attorney, Agent, or Firm*—Christie, Parker & Hale

[57] ABSTRACT

The invention relates to the measurement of the amount of impurity in a liquid. The invention is particularly directed to the measurement of the amount of free water in kerosene. Liquid is caused to flow through a filtration cell adapted to retain the impurity. The dielectric constant of the liquid is measured upstream and downstream of the filtration cell and the two measurements of dielectric constant are compared to give an indication of the level of said impurity in the liquid.

5 Claims, 1 Drawing Figure

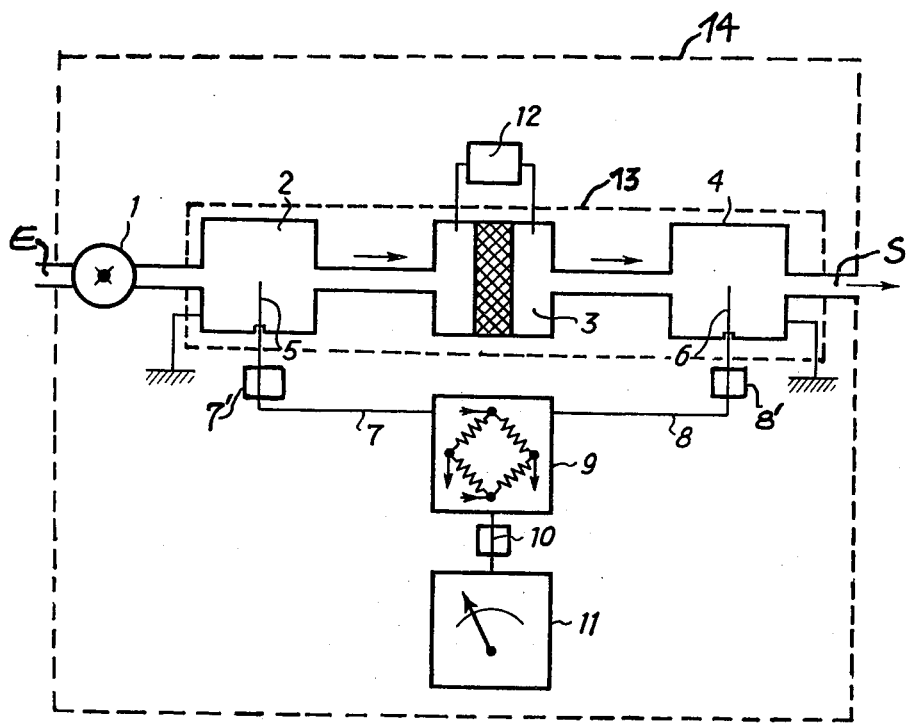

APPARATUS FOR MEASUREMENT OF THE AMOUNT OF IMPURITY IN A FLUID

BACKGROUND OF THE INVENTION

The present invention relates to the measurement of the amount of impurity in a liquid.

It concerns particularly the measurement of the amount of free water in kerosene or petroleum.

The amount of free water in kerosene intended for use in an aircraft engine must not exceed a certain level and it is therefore essential to determine this level before refilling the aircraft tank with kerosene.

Various processes and apparatus are known at present for measuring this level.

Some of these are laboratory processes which are relatively precise but take a long time to carry out while others are cruder processes which lack precision but can be carried out at the time of refilling the aircraft.

The cruder processes generally involve colorimetric determinations (visual assessment of the turbidity of the kerosene), colorimetric indicators in the form of powder or tablets to be mixed with the kerosene whereas laboratory processes consist in measuring the dielectric constant or specific inductive power of the kerosene to determine the level of free water in the kerosene.

These processes in which the dielectric constant of kerosene is determined have the disadvantage that this constant depends not only on the water content but also on the nature of the kerosene and hence the origin of the kerosene and on the temperature at which the measurement is carried out.

Measurement of the dielectric constant of kerosene which contains water must therefore be accompanied by a measurement of the dielectric constant of the kerosene itself free from water and must be accompanied by a standardisation showing the variation of the constant with temperature if the two measurements are not carried out at the same temperature.

Processes for determining the water content based on a measurement of the dielectric constant have hitherto only been used in exceptional cases in practice due to the disadvantages mentioned above as a result of which these processes take a long time to carry out.

An embodiment of the present invention provides an apparatus for determining the free water content of a petroleum by a measurement of the dielectric constant which will be easy to carry out and can be used on the site at the time of refilling without requiring a laboratory.

SUMMARY OF THE INVENTION

The invention provides a particular apparatus for measuring the concentration in a liquid of an impurity the presence of which modifies the dielectric constant of the liquid. The apparatus comprises a succession of cells including in order, a first measuring cell, a filtration cell and a second measuring cell, each measuring cell comprising a condenser and the apparatus having means for causing the liquid to pass between the condenser plates of the first measuring cell, then across the filtration cell and then between the condenser plates of the second measuring cell. The filtration cell comprises means for retaining the free water which is present in the liquid and which constitutes the impurity which is required to be measured. A comparator device is electricaly connected to the condensers of the measuring cells and produces a signal representing the difference between the dielectric constants of the liquid passing through the first measuring cell and of the liquid passing through the second measuring cell. The signal is transmitted to an apparatus adapted to indicate the value of the signal.

The process and apparatus of the invention can be used for determining the level of impurity in a liquid other than kerosene.

For example, the liquid may be a solvent such as trichloroethylene, carbon tetrachloride, a freon, etc..

BRIEF DESCRIPTION OF THE FIGURE OF THE DRAWING

An apparatus for carrying out the process of the invention will be described hereinafter with reference to the single FIGURE in the attached drawing which is a schematic diagram of one embodiment of the present invention.

PARTICULAR DESCRIPTION OF THE INVENTION

The apparatus comprises a pump 1 arranged to circulate the liquid containing the impurity, for example kerosene containing water, through a group of cells in succession, namely a measuring cell 2, a filtration cell 3 and a measuring cell 4, the fluid being circulated in the direction indicated by the arrow.

The measuring cells 2 and 4 may be identical or different and each cell comprises a condenser between the plates of which the kerosene is passed. These two plates may consist, respectively, for example of the conductive wall of the cell which is connected to earth and of an insulated electrode. These two insulated electrodes, namely the electrode 5 of the cell 2 and the electrode 6 of the cell 4, respectively, are electrically connected to a comparator device 9 by conductors 7 and 8 respectively.

This comparator device consists, for example, of a resistance bridge such as a Wheatstone bridge into the two arms of which the two cells 2 and 4 are connected which furnish a sinusoidal signal the amplitude of which depends on the capacity of the cell.

According to one variation, the signal provided by the cells are amplified before being transmitted to the two arms of the bridge.

In the bridge represented in the FIGURE, two arms are under the influence of the signals of the two cells in such a manner that the bridge provides a signal of disequilibrium which is a function of the difference between these signals.

In the simplest embodiment, each of the two arms is fed with its corresponding signal which may, if desired, be amplified, that is to say, the signal from the cell 2 may be amplified at 7' and the signal from cell 4 may be amplified at 8'.

For the sake of simplicity, the means of electric supply to the cells has not been shown in the FIGURE.

The bridge is balanced by the resistances in the two other arms of the bridge.

If the two measuring cells are different, this adjustment obviously makes up for the difference so that the signal of disequilibrium of the bridge retains its desired significance.

The signal of nonequilibrium of the bridge is transmitted to an indicator apparatus 11, if desired after amplification in an amplifier. This indicator apparatus may, for example, be a galvanometer the deflection of which increases with increasing difference between the dielectric constants measured in the two measuring cells 2 and 4. The dial of this galvanometer may be graduated to indicate the level of impurity directly either in percentages of water or in parts of water per million.

The filtration cell 3 may be any cell capable of retaining the free water present in kerosene; this cell may consist, for example, of a filter of the type using filtration plates or it may comprise a mass which absorbs humidity, such as a mass of alumina, if desired followed by an additional filter.

As a safety measure, a differential manometer 12 or any equivalent means is attached to the cell 3 to detect clogging of the active mass of the cell by the water which has to be retained in it.

The whole apparatus may be arranged in series in a system of circulation such that the whole flow passes through the three cells or, preferably, it is placeddin a by-pass or alternatively the liquid may be pumped from a cistern and returned to it.

The three cells are preferably arranged in series inside a massive box. This arrangement dispenses with the need to provide means for compensating the temperature since it is isothermal.

This box may, for example, be a box as indicated at 13 which encloses only the three cells or it may be a box as indicated at 14 which encloses the three cells as well as at least part of the remainder of the apparatus. The box 13 or 14 has an inlet for liquid E connected to the cell 2 and an outlet for liquid S connected to the cell 4.

Satisfactory results may be obtained, for example, with an apparatus in which the capacitances of the cells are of the order of 20 to 100 picofarads in air and the rate of flow of liquid is of the order of 100 l/h.

The apparatus according to the invention can easily be used wherever required, in particular between the aircraft tank and the installation from which the kerosene is supplied to the tank, no allowance has to be made for the temperature since the two cells are both at the same temperature and the time required for the kerosene to pass from one measuring cell to the other is extremely short, being of the order of 5 to 10 seconds, and the same kerosene passes through the two measuring cells.

It is to be understood that the invention is not limited to any particular type of measuring cell, that the measuring cells may comprise several condensers and that the invention is not limited to any particular type of filtration cell, the term filtration cell denoting any means suitable for connection into the liquid circuit to retain the impurity the level of which is required to be determined.

I claim:

1. An apparatus for measuring the concentration in a liquid of an impurity the presence of which modifies the dielectric constant of the liquid, comprising a succession of cells including in order, a first measuring cell, a filtration cell and a second measuring cell, each measuring cell comprising a condenser and the apparatus having means for causing the liquid to pass between the condenser plates of the first measuring cell, then across the filtration cell and then between the condenser plates of the second measuring cell, said filtration cell comprising means for retaining the free water which is present in the liquid and which constitutes the impurity which is required to be measured, a comparator device electrically connected to the condensers of the measuring cells, said comparator producing a signal representing the difference between the dielectric constants of the liquid passing through the first measuring cell and of the liquid passing through the second measuring cell, the said signal being transmitted to an apparatus adapted to indicate the value of the signal.

2. An apparatus according to claim 1 comprising detecting means connected to the filtration cell to verify satisfactory functioning of the cell.

3. An apparatus according to claim 2, in which the three cells are arranged in a box provided with an inlet for liquid connected to the first measuring cell and an outlet for liquid connected to the outlet of the second measuring cell.

4. Apparatus according to claim 3, in which the measuring cells have a capacitance of between 20 and 100 picofarads in air.

5. Apparatus according to claim 4, in which the said liquid is kerosene, the said impurity being free water present in the kerosene.

* * * * *